(12) United States Patent
Sick et al.

(10) Patent No.: US 11,473,249 B2
(45) Date of Patent: Oct. 18, 2022

(54) USING A POLYOL MIXTURE COMPRISING PBD FOR CREATING A PU-BASED ARTIFICIAL TURF

(71) Applicants: Advanced Polymer Technologies Corp., Harmony, PA (US); Synthetic Turf Resources Corp., Dalton, GA (US)

(72) Inventors: Stephan Sick, Willich-Neersen (DE); Frank Lucarelli, Zelienople, PA (US); Axel Hinrichs, Acworth, GA (US); Andreas Schulze-Ising, Sewickley, PA (US); Matthew Lee Henson, Acworth, GA (US); Erin Anderson Tidwell, Caulhoun, GA (US)

(73) Assignees: Advanced Polymer Technologies Corp., Harmony, PA (US); Synthetic Turf Resources Corp., Dalton, PA (US)

( * ) Notice: Subject to any disclaimer, the term of this patent is extended or adjusted under 35 U.S.C. 154(b) by 133 days.

(21) Appl. No.: 16/085,800

(22) PCT Filed: Mar. 17, 2017

(86) PCT No.: PCT/EP2017/056442
§ 371 (c)(1),
(2) Date: Sep. 17, 2018

(87) PCT Pub. No.: WO2017/158183
PCT Pub. Date: Sep. 21, 2017

(65) Prior Publication Data
US 2019/0093291 A1 Mar. 28, 2019

Related U.S. Application Data

(63) Continuation of application No. 15/074,136, filed on Mar. 18, 2016, now Pat. No. 10,870,952.

(30) Foreign Application Priority Data

Mar. 18, 2016 (EP) .................................... 16161220

(51) Int. Cl.
*E01C 13/08* (2006.01)
*C08G 18/62* (2006.01)
(Continued)

(52) U.S. Cl.
CPC ................ *E01C 13/08* (2013.01); *B05D 1/26* (2013.01); *B05D 3/02* (2013.01); *C08G 18/4063* (2013.01);
(Continued)

(58) Field of Classification Search
CPC ........ B05D 1/26; B05D 3/02; B05D 2503/00; C08G 18/42; C08G 18/4063;
(Continued)

(56) References Cited

U.S. PATENT DOCUMENTS 3,705,834 A 12/1972 Terry
3,821,067 A 6/1974 Taylor et al.
(Continued)

FOREIGN PATENT DOCUMENTS

EP 2940212 A1 * 11/2015 ........... D01D 5/0885
EP 3219847 A1 9/2017
(Continued)

OTHER PUBLICATIONS

Definition of "Mesh Fabrics" from Complete Textile Glossary, Celanese Acetate, 2001.*
(Continued)

*Primary Examiner* — Cheryl Juska
(74) *Attorney, Agent, or Firm* — Harness, Dickey & Pierce, P.L.C.

(57) ABSTRACT

A method of manufacturing an artificial turf includes creating fluid polyurethane mass. The creation including reacting
(Continued)

first and second polyols with an isocyanate. The first polyol is a polyether polyol and/or a polyester polyol having at least 2 hydroxyl groups per molecule, the second polyol being polybutadien diol. The isocyanate including isocyanate monomers, isocyanate polymers or isocyanate prepolymers or a mixture thereof, the isocyanate monomers, isocyanate polymers and the isocyanate prepolymers having two or more isocyanate groups per molecule. The method further includes incorporating an artificial turf fiber into a carrier such that a first portion of the fiber protrudes to the front side of the carrier and that a second portion of the fiber is located at the back side of the carrier, adding the fluid polyurethane mass on the back side of the carrier, and hardening the fluid polyurethane mass.

23 Claims, 3 Drawing Sheets

(51) Int. Cl.
| | | |
|---|---|---|
| *C08G 18/40* | (2006.01) | |
| *C08G 18/42* | (2006.01) | |
| *C08G 18/48* | (2006.01) | |
| *C08G 18/76* | (2006.01) | |
| *D06N 7/00* | (2006.01) | |
| *B05D 3/02* | (2006.01) | |
| *B05D 1/26* | (2006.01) | |

(52) U.S. Cl.
CPC ......... *C08G 18/42* (2013.01); *C08G 18/4825* (2013.01); *C08G 18/6208* (2013.01); *C08G 18/7671* (2013.01); *D06N 7/0071* (2013.01); *B05D 2503/00* (2013.01); *D06N 2203/068* (2013.01); *D10B 2401/06* (2013.01); *D10B 2505/202* (2013.01); *Y10T 428/23979* (2015.04); *Y10T 428/23986* (2015.04); *Y10T 428/23993* (2015.04)

(58) Field of Classification Search
CPC ............ C08G 18/4825; C08G 18/6208; C08G 18/7671; E01C 13/08; D06N 7/0071; D06N 2203/068; Y10T 428/23979; Y10T 428/23986; Y10T 428/23993; D10B 2401/06; D10B 2505/202; D10B 2503/041; D10B 2503/042; D05C 17/023
See application file for complete search history.

(56) References Cited

U.S. PATENT DOCUMENTS

| | | | |
|---|---|---|---|
| 3,869,421 | A | 3/1975 | Sapp et al. |
| 4,426,415 | A * | 1/1984 | Avery ................. B32B 5/26 |
| | | | 428/17 |
| 4,507,430 | A | 3/1985 | Shimada et al. |
| 4,632,850 | A | 12/1986 | Tillotson |
| 4,898,919 | A | 2/1990 | Ueda et al. |
| 5,026,580 | A | 6/1991 | Hammon |
| 5,104,693 | A | 4/1992 | Jenkines |
| 5,205,562 | A | 4/1993 | Hammon |
| 5,710,192 | A | 1/1998 | Hernandez |
| 5,849,806 | A | 12/1998 | St. Clair et al. |
| 5,874,484 | A | 2/1999 | Dirckx et al. |
| 5,973,016 | A | 10/1999 | St. Clair et al. |
| 7,112,631 | B2 | 9/2006 | Zhang et al. |
| 8,962,785 | B2 | 2/2015 | Faust et al. |
| 2004/0079482 | A1 | 4/2004 | Zhang et al. |
| 2006/0165951 | A1 | 7/2006 | Holeschovsky et al. |
| 2007/0027272 | A1 | 2/2007 | Zhang et al. |
| 2009/0062432 | A1 | 3/2009 | Doesburg et al. |
| 2009/0275690 | A1 | 11/2009 | Weaver et al. |
| 2010/0055358 | A1 | 3/2010 | Weaver et al. |
| 2012/0125474 | A1 | 5/2012 | Frenken et al. |
| 2012/0315816 | A1 | 12/2012 | Fowler et al. |
| 2013/0079487 | A1 | 3/2013 | Faust et al. |
| 2013/0344281 | A1 | 12/2013 | Wright et al. |
| 2015/0176201 | A1 | 6/2015 | Flendrig et al. |
| 2015/0308056 | A1 | 10/2015 | Spittle et al. |
| 2016/0046757 | A1 | 2/2016 | Landers et al. |
| 2017/0051453 | A1 | 2/2017 | Sick et al. |
| 2017/0121856 | A1 | 5/2017 | Sick et al. |
| 2017/0265547 | A1 | 9/2017 | Sick et al. |
| 2018/0058017 | A1 | 3/2018 | Schmitz et al. |
| 2018/0291567 | A1 | 10/2018 | Sick et al. |
| 2019/0017206 | A1 | 1/2019 | Sick et al. |
| 2019/0093291 | A1 | 3/2019 | Sick et al. |
| 2019/0100857 | A1 | 4/2019 | Sick et al. |
| 2019/0177882 | A1 | 6/2019 | Sick et al. |

FOREIGN PATENT DOCUMENTS

| | | |
|---|---|---|
| GB | 2313128 A | 11/1997 |
| JP | 2006/096912 A | 4/2006 |
| WO | WO-1999010401 A1 | 3/1999 |
| WO | WO-2009/056284 A1 | 5/2009 |
| WO | WO-2015/081080 A1 | 6/2015 |

OTHER PUBLICATIONS

U.S. Office Action dated Jun. 11, 2020 for corresponding U.S. Appl. No. 16/009,733.
U.S. Notice of Allowance dated Jul. 1, 2020 in corresponding U.S. Appl. No. 15/074,136.
U.S. Office Action issued in co-pending U.S. Appl. No. 15/074,136 dated Aug. 23, 2018.
International Search Report PCT/ISA/210 for International Application No. PCT/EP2017/056442 dated Apr. 11, 2017.
Written Opinion of the International Searching Authority PCT/ISA/237 for International Application No. PCT/EP2017/056442 dated Apr. 11, 2017.
International Preliminary Report on Patentability for International Applicaition No. PCT/EP2017/056442 dated Mar. 26, 2018.
U.S. Office Action issued in co-pending U.S. Appl. No. 15/074,136 dated Jan. 31, 2019.
U.S. Office Action dated May 22, 2020 for corresponding U.S. Appl. No. 15/074,136.
"Polyurethanes: Science, Technology, Markets, and Trends", Mark F. Sonnenschein, 2014, ISBN: 978-1-118-73791-0.
Canadian Office Action dated Apr. 28. 2020 for corresponding Canadian Application No. 3,010,557.
New Zealand First Examination Report dated May 28, 2019 for corresponding Application No. 743825.
U.S. Office Action dated Dec. 10, 2019 for corresponding U.S. Application No. 15/074.136.
U.S. Notice of Allowance dated Sep. 2, 2020 in corresponding U.S. Appl. No. 15/074,136.
U.S. Notice of Allowance dated Sep. 2, 2020 in corresponding U.S. Appl. No. 16/009,733.
Canadian Office Action dated Oct. 20, 2020 for corresponding Canadian Application No. 3,010,557.
Canadian Office Action dated Apr. 9, 2021 for corresponding Canadian Application No. 3,010,557.

* cited by examiner

USING A POLYOL MIXTURE COMPRISING PBD FOR CREATING A PU-BASED ARTIFICIAL TURF

CROSS-REFERENCE TO RELATED APPLICATIONS

This application is a national phase under 35 U.S.C. § 371 of PCT International Application No. PCT/EP2017/056442 which has an International filing date of Mar. 17, 2017, which claims priority to European Application No. 16161220.5, filed Mar. 18, 2016 and U.S. Application No. 15/074,136, filed Mar. 18, 2016, the entire contents of each of which are hereby incorporated by reference.

FIELD OF THE INVENTION

The invention relates to artificial turf and the production of artificial turf which is also referred to as synthetic turf.

BACKGROUND AND RELATED ART

Artificial turf or artificial grass is surface that is made up of fibers which is used to replace grass. The structure of the artificial turf is designed such that the artificial turf has an appearance which resembles grass. Typically artificial turf is used as a surface for sports such as soccer, American football, rugby, tennis, golf, for playing fields, or exercise fields. Furthermore artificial turf is frequently used for landscaping applications.

Artificial turf fields are brushed regularly to help fibers stand-up after being stepped down during the play or exercise. Throughout the typical usage time of 5-15 years it may be beneficial if an artificial turf sports field can withstand high mechanical wear, can resist UV, can withstand thermal cycling or thermal ageing, can resist inter-actions with chemicals and various environmental conditions. It is therefore beneficial if the artificial turf has a long usable life, is durable, and keeps its playing and surface characteristics as well as appearance throughout its usage time.

US 2009/0275690 A1 describes a method for promoting adhesion between an apolar material, e.g. polyethylene and a polar material, e.g. polyurethane. Adhesion to an apolar material is promoted by creating a blend of a non-polar polyolefin and a polydiene-based polyurethane. A polymer blend is a material analogous to metal alloys, in which at least two polymers are blended together to create a new material with different physical properties. In this purely "physical" mixture no new chemical bonds between the macromolecules of the two or more different polymers are created.

WO 2015/081080 A1 discloses a proppant that includes a particle present in an amount from 90% to 95% by weight based on the total weight of the proppant, and a polyurethane coating disposed about the particle and present in an amount from 0.5 to 10% by weight of the proppant. The polyurethane coating comprises the reaction product of an isocyanate component and an isocyanate-reactive component comprising a polydiene polyol.

WO 99/10401 A1 discloses a structural adhesive composition comprising a polyurethane which is obtainable by reacting a polyisocyanate having a functionality in the range of from 2 to 3 and a hydrogenated polybutadiene polyol, having a functionality in the range from 1.5 to 2.5, and a 1,2 vinyl content prior to hydrogenation of from 30 to 70% by weight. The NCO:OH molar ratio is in the range from than 1.05 up to 1.6.

WO 2009/056284 A1 discloses method for the manufacture of artificial grass which consists of spraying onto the rear of o the primary turf carpet a two- or three-component polyurethane product, that crosslinks rapidly, even at low temperatures, to give a compact, elastic, uniform and bubble-free film of a coating-adhesive, which shows an improved chemical and water resistance and bonds firmly the tufts to the primary web.

GB 2313128 A discloses stain-resistant polyurethanes which are reaction products of organic isocyanates and hydrophobic compounds having at least two isocyanate-reactive hydrogens, long-chain hydrocarbons and mixtures thereof, optionally with other ingredients. The polyurethanes are hydrophobic in nature. The stain resistant polyurethanes can be tailored to a desired hardness.

JP 2006 096912 A discloses a two-pack curable type polyurethane resin composition. The composition comprises a principal agent contained in a urethane prepolymer (A) obtained by reacting a polyol (a) containing 10-60 mass % of polybutadiene polyol with a polyisocyanate (b) and an isocyanurate group- containing polyisocyanate (B) and a curing agent containing a polyol (C) containing 10-50 mass % of the polybutadiene polyol. The molar ratio (NCO/OH) of isocyanate groups contained in the principal agent to hydroxyl groups contained in the curing agent is 0.8-1.05.

It may be desirable to manufacture artificial turf fibers having a set of desired properties e.g. in respect to smoothness, tensile strength, resistance to shear forces, and/or resistance to splicing of fibers.

SUMMARY

The invention provides for a method of manufacturing artificial turf in the independent claims. Embodiments are given in the dependent claims. Embodiments can freely be combined with each other if they are not mutually exclusive.

In one aspect, the invention relates to a method of manufacturing artificial turf. The method comprises:
Creating fluid polyurethane mass, the creation comprising
  reacting first and second polyols with an isocyanate,
    the first polyol being polyether polyol and/or polyester polyol having at least 2 hydroxyl groups per molecule, and the second polyol being polybutadiene diol;
  the isocyanate comprising isocyanate monomers, isocyanate polymers or isocyanate prepolymers or a mixture thereof, the isocyanate monomers, isocyanate polymers and the isocyanate prepolymers having two or more isocyanate groups per molecule;
incorporating an artificial turf fiber into a carrier such that a first portion of the fiber protrudes to the front side of the carrier and that a second portion of the fiber is located at the back side of the carrier; and
adding the fluid polyurethane mass on the back side of the carrier, the polyurethane mass thereby incorporating at least the second portions of the fiber; and
hardening the fluid polyurethane mass on the back side of the carrier.

Said particular way of creating artificial turf with a polyurethane (PU)-based backing may be advantageous as this type of backing material may be capable of fixing hydrophobic polyolefin fibers more firmly and more reliably. Many polymers used for producing artificial turf fibers, e.g. polyethylene, are hydrophobic. To the contrary, polyurethane is a hydrophilic material. As a consequence, Van-der-Waals forces between the fibers and the PU backing are weak and fibers may easily be pulled out of a PU backing when a tuft-withdrawal force is applied. By adding polybutadiene diol (PBD) in the reaction mixture used for creating the PU in a polyaddition reaction, the PU is made more hydrophobic and the attachment of the PU to the fiber via Van-der-Waals forces is increased. In the polyaddition reaction, the PBD acts as a hydrophobic polyol that increases hydrophobicity of the PU. The resulting PU be more hydrophobic than a standard PU and will attach more strongly to a polyethylene surface or fiber. The new PU variant is used for the production of artificial turf capable of strongly fixing individual monofilaments, fibers made of multiple monofilaments or tapes made of hydrophobic material, e.g. PE, in the backing.

In a further beneficial aspect, the creation of the PU-based backing according to embodiments of the invention may be advantageous as said type of backing is better protected against the effects of water. Applicant has observed that water, e.g.

rain falling on artificial lawn of a sports field, may act as a softening agent in respect to PU. If PU is contacted with water, the water softens the PU and causes the PU to swell. The swelling may cause the destruction of the mechanical fixing of the fibers both in polyester-based as well as in polyether-based PU. Moreover, the contact with water may chemically destroy polyester-based PU by saponification which may also result in the destruction of the mechanical fixing of the fibers in the PU backing. Thus, in a further aspect, embodiments of the invention relate to a method for providing a hydrolytically stable form of PU that does neither swell nor saponificate significantly when exposed to water and water-based liquids.

Thus, according to embodiments, the polybutadiene diol is added to the polyols or to a reaction mixture comprising the polyols and the isocyanate for increasing the hydrophobicity of the PU and/or for creating a hydrolytically stable form of PU, i.e., a PU that does neither swell nor saponificate when exposed to water and/or for strongly mechanically fixing hydrophobic polyolefin fibers incorporated at least partially in the PU backing.

In a further beneficial aspect, chemical bonds between the PBD and the polyisocyanates are created, thereby preventing any delamination effect that may occur if hydrophilic and hydrophobic substances are combined in a single blend. The reaction that creates the chemical bonds is a polyaddition reaction whereby the first polyol as well as the PBD respectively react with the isocyanate to form polyurethanes.

According to embodiments, the isocyanate is a diisocyanate.

According to embodiments, the at least two hydroxyl groups per molecule of the first polyol are two terminal hydroxyl groups.

According to embodiments, the polybutadiene diol has an amount of 0.5-10% by weight of a combination of the first polyol (i.e., the polyester-polyol or the polyether-polyol) and the isocyanate. According to some of said embodiments, the polybutadiene diol has an amount of 1.0-9% by weight of said combination and preferentially has an amount of 4.0-8.0% by weight of said combination.

Said features may be beneficial as it has been observed that this PBD concentration generates a PU backing that fixes polyolefin fibers embedded therein so strongly that a so-called "stip slick effect" occurs, in particular when using highly hydrophobic monofilaments, e.g. PE-monofilaments: a stick-slip effect describes a particular form of relative movement of two surfaces (e.g. a PE-fiber surface and the PU-surface surrounding said fiber), whereby the movement of the surfaces alternates between sticking to each other and sliding over each other, with a corresponding change in the force of friction. Typically, the static friction coefficient (a heuristic number) between two surfaces is larger than the kinetic friction coefficient. If an applied force is large enough to overcome the static friction, then the reduction of the friction to the kinetic friction can cause a sudden jump in the velocity of the movement.

Typically, the stip slick effect is considered as an unwanted effect, e.g. in respect to the relative movement of human skin and a PE fiber as in this context the risk of injuries and skin burns may be increased. However, applicant has surprisingly observed that the stip slick effect in the context of PE/PU surface movements is a desirable and useful effect as it increases the resistance of the fiber to tuft withdrawal forces. Even in case a pulling force is high enough to pull a fiber some distance out of the backing, the stip slick effect will cause the fiber to halt again, thereby causing the static friction coefficient rather the kinetic friction coefficient to take effect.

Thus, according to a further beneficial aspect of the invention, a PU-based artificial turf backing is provided that mechanically fixes hydrophobic polyolefin fibers or monofilaments, in particular PE-based fibers and monofilaments, particularly well by showing the stip slick effect.

In particular when the PBD is added to the reaction mix in the most preferred concentration range of 2.0-4.0% by weight of a combination of the first polyol and the isocyanate, e.g. 3% by weight of said combination, the artificial turf fibers are sometimes fixed so firmly in the PU backing that the fiber will in many cases be broken and torn apart rather than be pulled out of the backing.

Both the polyether-polyol and the polyester-polyol may consist of a single type of polyol or of a mixture of different types of polyols. Depending on the embodiment, the PBD and the first polyol can be added to the reaction mixture separately or can be contained in a single mixture that is mixed with the isocyanate.

According to embodiments, the first polyol is free of any PBD and hydrogenated PBD. In other words, the first polyol consists of one or more non-PBD-polyols.

According to embodiments, the first polyol is preferably a polyether polyol.

According to embodiments, the first polyol is preferably selected from a group comprising: a polycarbonate polyol, a polycaprolactone polyol, a propylene oxide based polyol, a polypropylene polyol, a polysulfide polyol, a polyether glycol like polytetramethylene ether glycol (PTMEG) or a mixture of one or more of said polyols. A "propylene oxide based polyol" may be generated from a monomer mix consisting of or comprising a propylene oxide monomer.

In a further embodiment, the first polyol is a mixture of one or more of the aforementioned polyetherpolyols together with a di- or tri-glycol having a hydroxyl value ranging from 400-2000 mg KOH/g. Preferentially, said di- or tri-glycoles are short chain di- or tri-glycoles. For example, the di- or tri-glycoles can be one or more of: diethylene glycole, dipropylene glycole, methyleneglycole, propyleneglycole, butyleneglycole. Adding the di- or tri-glycols may be advantageous as the crosslinking-density in the PU may be increased.

In further embodiments the first polyol comprises or consists of a mixture of a polyether polyol and a polyester polyol. Said polyester polyol can be, for example, vegetable oil based polyols as e.g. a castor oil based polyol as e.g. Desmophen® 1150 or soya bean oil based polyols or gained from a re-esterification process.

According to embodiments, the first polyol has a number average molecular weight in the range of 500-6000 g/mol, more preferably between 1.500 and 4.000 g/mol.

The number average molecular weight, Mn, is the total weight of all the polymer molecules in a sample, divided by the total number of polymer molecules in the sample.

According to embodiments, the polyether polyols is a bifunctional polyether polyol having a hydroxyl value of about 50-60 mg KOH/g. According to another example, a bifunctional polyether polyol having a hydroxyl number of about 26-30 mg KOH/g can be used, e.g. a polyol based on propylene oxide having a number average molecular weight of about 4000 g/mol. However, it is also possible to use polyether polyols having a lower or even higher molecular weight.

According to embodiments, the polybutadien diol has a number average molecular weight in the range of 1000-6000 g/mol, more preferably between 1.500 and 4.500 g/mol.

According to preferred embodiments, the polybutadien diol is a hydrogenated polybutadien diol. Using hydrogenated PBD may provide for an increased chemical stability of the generated PU. In particular, the saturated nature of the hydrogenated PBD provides light and weather stability, prevent the PU backing becoming yellow or lose its mechanical properties such as flexibility, elongation, and strength.

For example, a hydrogenated polybutadien diol having a number average molecular weight of about 2000 g/mol whose double bonds have been fully (>97%) hydrogenated, the hydroxyl units being retained, can be used as the PBD that is added to the reaction mix. According to another example, a polybutadien diol having a number average molecular weight of about 3000 g/mol can be used as the PBD that is added to the reaction mix.

According to embodiments, the method further comprises adding a wetting agent to a mixture comprising the first and/or second polyols and/or the isocyanate.

Adding a wetting agent to the reaction mixture for creating the PU mass may be advantageous as the wetting agent reduces the surface tension and helps the PU mass to wet the carrier (that can be, for example, a hydrophobic polyolefin-based textile) and/or to wet the monofilaments and fibers incorporated at least partially in the PU backing. Wetting monofilaments is a particularly demanding task for fixing tufted bundles of PE monofilaments in a PU coated backing. This is because monofilament tuft bundles are often aligned very close to each other, thereby prohibiting any PU liquid or PU foam to invade the space within a tufted monofilament bundle.

Using a wetting agent may be advantageous as the PBD has been observed to increase the viscosity of the liquid PU mass compared to the PU created from the same reaction mixture but lacking PBD. It has been observed that the wetting of the carrier textile and/or the wetting of the fibers is reduced by an increase of PU-viscosity. Using the wetting agent compensates for this effect, thereby allowing to increase the hydrophobicity without negatively affecting the wetting of the fibers.

In a further beneficial aspect, the wetting agent allows using higher PBD amounts and thus generating a more hydrophobic PU as the wetting agent compensates for the increased viscosity.

According to embodiments, the wetting agent is a surfactant having an amount of 0.01% to 1.0% by weight of a combination of the first and second polyols and the isocyanate, more preferentially an amount of 0.8%-1.2% by weight of said combination and most preferentially an amount of 0.05-0.15% by weight of said combination.

Said surfactant concentration is typically not high enough for strong foam generation and for controlling the density and volume of the PU foam applied on the backside of an artificial turf backing carrier. However, as the surfactant according to embodiments of the invention is not added for creating foam but rather as a wetting agent, the above mentioned concentration ranges are preferable.

The "backside" of the carrier as used herein is the side opposite to the side from which the larger portions of the fibers emanate.

"Surfactants" as used herein are compounds that lower the surface tension (or interfacial tension) between two liquids or between a liquid and a solid. Surfactants may be, for example, amphiphilic substances, in particular organic amphiphilic substances which contain both hydrophobic groups and hydrophilic groups. Therefore, a surfactant contains both a water-insoluble (or oil-soluble) component and a water-soluble component. Surfactants will diffuse in an the liquid PU mass and will adsorb at interfaces between the PU mass and the hydrophobic monofilaments and/or the hydrophobic carrier of the backing. A surfactant may be, for example, a hydrocarbon surfactant such as, for example, Triton X-100, or, more preferentially, a fluorosurfactant or a mixture of hydrocarbon surfactant and a fluorosurfactant. Fluorosurfactants have a hydrophobic tail in the form of a straight chain fluorocarbon and a polar portion. Fluorosurfactants are particularly stable, also in harsh thermal and/or chemical environments.

According to embodiments, the method comprises adding an oil to the mixture comprising the polyols and/or comprising the isocyanate. The oil is added in an amount of 0.5% to 4%, more preferentially 0.7% to 1.2% by weight of a combination of the polyols and the isocyanate. Preferably, the oil is a mineral oil, still preferably a pale oil or a mixture of pale oils.

An oil is any neutral, nonpolar chemical substance that is a viscous liquid at ambient temperatures and is both hydrophobic and lipophilic. Oils have a high carbon and hydrogen content and are usually flammable and surface active.

"Pale oils" or "white oils" as used herein are highly refined mineral oils that are only lightly colored or colorless and that are chemically inert. For example, a petroleum lubricating or process oil refined until its color (measured by transmitted light) is straw to pale yellow is a "pale oil". Preferentially, the pale oils used for embodiments of the invention are also pure, stable, odorless and non-toxic. The term "white oil" is a misnomer, in that white oils are not white, but crystal clear. Pale oils can be produced from a variety of substances, depending on the process used. For example, naphthenic oils and some mineral oils can be used as pale oils.

For instance, light colored, non-staining naphthenic oils refined from specially selected wax-free crude through the use of severe hydrogenation can be used, e.g. PALE OIL 40-NYTEX 5130 of NYNAS.

The term "tufting" as used herein is a further method of incorporating a fiber into an existing carrier. Short U-shaped loops of fibers are introduced through the carrier from one side so that their ends point outside of the carrier in the other direction. Usually, the tuft yarns form a regular array of "dots" on the other side. On the one side of the carrier where the U-shaped loops are located, the tuft fibers may be tied for security, although they need not be. The ends of the tuft yarns can then optionally be frayed or otherwise processed, so that they will subsequently felt, creating a dense layer of fibers protruding from the carrier.

The term "weaving" as used herein is a method of incorporating an artificial turf fiber (which can be a monofilament or a bundle of monofilaments) into an existing carrier mesh, whereby the artificial turf fiber and the fiber(s) that built the carrier mesh are interlaced. The interlaced fibers and the mesh form a fabric like or cloth like structure. When an artificial tuft fiber is incorporated by weaving, the fiber interlaces a series of mesh fibers at least three times. Thus, when a fiber is incorporated by weaving rather than tufting, a higher fraction of the artificial turf fiber is interlaced in the carrier material. This may increase the resistance to wear and tear of the artificial turf.

Adding pale oil may further reduce the viscosity of the liquid PU mass, thereby increasing the wetting of the carrier and/or the artificial turf monomers and fibers and increasing the strength of the mechanical fixing.

According to embodiments, the method further comprises adding a catalyst to the polyols or to the isocyanate or to a reaction mixture comprising the same.

According to embodiments, the fluid polyurethane mass has a density of more than 1000 g/l, preferentially having a density in the range of 1100 g/l-1500 g/l, more preferentially in a range of 1200 g/l-1400 g/l. The first polyol and/or the catalyst may be chosen such that the density of the generated PU mass is in at least one of the specified density ranges. Said density ranges have been observed to provide PU-based artificial turf backings that can be easily laid without bulging, that is elastic and robust against various pulling, pushing and shear forces.

According to some embodiments, the liquid PU mass is a non-foam polyurethane, i.e., a PU that is (substantially) non-porous.

Foams and fluids in this high density range are often highly viscous and often do not wet fibers and in particular monofilaments within monofilament bundles appropriately. However, by using a more hydrophobic PU form, optionally further comprising a wetting agent, also PU masses having the above mentioned high density can be used for firmly fixing PE filaments by Van-der-Waals forces. Thus, embodiments of the invention may allow to firmly fix hydrophobic fibers also in a high-density PU backing.

According to embodiments, incorporating the artificial turf fiber into the carrier comprises: tufting the artificial turf fiber into the carrier. According to alternative embodiments, incorporating the artificial turf fiber into the carrier comprises weaving the artificial turf fiber into the carrier.

According to embodiments, the artificial turf fiber is a bundle of monofilaments. In this context, using a more hydrophobic PU version, optionally in combination with a wetting agent, is particularly advantageous as standard PU foams and fluids usually are not able to wet the monofilaments located at the inside of a monofilament bundle. By wetting also the monofilaments inside said bundles, the mechanical fixing is significantly increased.

According to embodiments, the artificial turf fiber is a hydrophobic polyolefin fiber, e.g. a polyethylene (PE) fiber, a polypropylene (PP) fiber, a polybutylene fiber or a fiber consisting of a polymer blend comprising a hydrophobic polyolefin as main component.

Depending on the embodiment, the hardening process may be performed passively, e.g. by incubating the liquid PU mass applied and dispersed on the back side of the carrier at room temperature, or by heating the PU backing for a given time to temperature significantly above room temperature.

According to some embodiments, the hardening of the fluid polyurethane mass comprises heating the polyurethane mass having been applied and dispersed on the back side of the carrier to a temperature of 70-140° C. For instance, the heat is applied for a time period of 1-5 minutes, preferentially 2-3 minutes.

The hardening process, also referred to as "curing" process, is performed to let the residual liquids leave the PU mass so that the PU mass hardens and develops its strength. The hardened PU mass on the backing will tightly enclose the portions of the fibers having been incorporated in the fluid polyurethane mass.

According to embodiments, the method further comprises generating the polymer fiber. The generation comprises:
  generating a polymer mixture;
  extruding the polymer mixture into a monofilament;
  quenching the monofilament;
  reheating the monofilament;
  stretching the reheated monofilament to form the monofilament into the artificial turf fiber.

According to embodiments, the generated polymer mixture further comprises a nucleating agent for crystallizing the polymer within and at the surface of the monofilament. The nucleating agent is an inorganic and/or an organic substance or a mixture thereof.

A "nucleating agent" as used herein is a substance that promotes the crystallization of polymers, in particular semi-crystalline polymers. These additives function by presenting a heterogeneous surface to the polymer melt, making the crystallization process more thermodynamically favorable.

For example, the inorganic substance used as the nucleating agent can consist of one or more of the following:
  talcum;
  kaolin;
  calcium carbonate;
  magnesium carbonate;
  silicate;
  silicic acid;
  silicic acid ester;
  aluminium trihydrate;
  magnesium hydroxide;
  meta- and/or polyphosphates; and
  coal fly ash;

For example, the organic substance used as the nucleating agent can consist of one or more of the following:
  1,2-cyclohexane dicarbonic acid salt;
  benzoic acid;
  benzoic acid salt;
  sorbic acid; and
  sorbic acid salt.

The stretching of the reheated monofilament causes the monofilament to form into an artificial turf fiber, wherein during the stretching the nucleating agent boosts the creation of crystalline portions of the polymer within the monofilament. The boosting of the creation of the crystalline portions increases the surface roughness of the monofilament.

According to embodiments, the generated polymer mixture that is to be extruded to form the monofilament further comprises a nucleating agent for crystallizing the polymer within and at the surface of the monofilament.

According to embodiments, the artificial turf fiber consists of a bundle of monofilaments. Thus, the monofilaments are incorporated in the carrier and are wetted by the fluid PU mass as a bundle of at least two, preferably at least four monofilaments.

Using a nucleating agent in the polymer mixture that forms the artificial turf fiber in combination with the liquid PU mass according to embodiments of the invention may have the advantageous, synergistic effect that even artificial turf fibers consisting bundles of monofilaments can firmly and reliably be fixed in the backing thanks to the increased surface roughness induced by the nucleating agent. In particular, the slip-stick effect may be enhanced. Crystalline portions on the surface of the individual monofilaments increase the surface roughness and increase the total size of the surface, thereby increasing the contact area with the "hydrophobized" PU of the backing. Bundles of monofilaments which are incorporated collectively in the carrier have been observed to have a particular high risk of being pulled out by strong mechanical forces because capillary forces may soak (rain) water along the surface of the individual monofilaments within a bundle to the interior of the carrier and the backing. In some state of the art artificial turf types, monofilaments within a bundle are so tightly packed that the secondary backing cannot reach the inner parts of the bundle and thus cannot mechanically fix the individual monofilaments. However, water, which is much less viscous than a PU mass, may reach the interior of the bundle, thereby causing hydrophilic backing material to detach from the bundle or even causing blends of hydrophobic and hydrophilic material used as secondary backing to delaminate. To the contrary, using bundles of monofilaments whose surface roughness is increased by a nucleating agent may increase the surface roughness of the monofilaments and may allow the liquid PU mass to reach the inner parts of a monofilament bundle. Thus, the nucleating agent may allow the "hydrophobized" PU mass to reach the interior of a monofilament bundle, to mechanically fix all monofilaments of the bundle individually, to reliably prevent the intrusion of rain water into the bundle and thus to prevent any delamination effects caused by said water. In effect, a "slip-stick" effect is observed when pulling a fiber out of the backing. The stip-stick effect may stop the fiber from being pulled out even in case the fiber became detached from its original position.

According to embodiments, the incorporating of the artificial turf fiber into the artificial turf backing comprises:
    arranging a plurality of the artificial turf fibers on the carrier, wherein first parts of the monofilaments of the arranged artificial turf fibers are exposed to a bottom side of the carrier and second parts of said monofilaments are exposed to a top side of the carrier;
    adding the fluid polyurethane mass on the bottom side of the carrier such that at least the first parts become embedded in the fluid polyurethane mass; and
    causing the fluid polyurethane mass to solidify into a film, the film surrounding and thereby mechanically fixing at least the first parts of the monofilaments of the arranged artificial turf fibers, the solid film acting as the artificial turf backing.

After the extrusion and stretching of the monofilament, the monofilament polymer comprises crystalline portions and amorphous portions. The presence of the nucleating agent in the polymer mixture during the stretching causes an increase in the size of the crystalline portions relative to the amorphous portions.

According to embodiments, at least 20% the inorganic nucleating agent has a grain size smaller than 1 micrometer.

According to embodiments, the polymer mixture used for creating the monofilament comprises 0.01-3 percentage by weight the inorganic substance acting as the nucleating agent.

According to embodiments, the polymer that forms the monofilament is any one of the following: polyethylene, polypropylene, and a mixture thereof.

According to embodiments, the nucleating agent is an inorganic substance and the determined amount of the nucleating agent is 0.01-3 percentage by weight of the polymer mixture.

In a further aspect, the invention relates to an artificial turf manufactured according to the method for generating a PU-based artificial turf according to any one of the embodiments described herein.

In a further aspect, the invention relates to artificial turf comprising a polyurethane backing. The polyurethane is the reaction product of first and second polyols with an isocyanate. The first polyol is polyether polyol and/or polyester polyol having at least 2 hydroxyl groups per molecule. The second polyol is polybutadien diol. The isocyanate comprises isocyanate monomers, isocyanate polymers or isocyanate prepolymers or a mixture thereof. The isocyanate monomers, isocyanate polymers and the isocyanate prepolymers have two or more isocyanate groups per molecule.

The artificial turf further comprises a carrier and an artificial turf fiber incorporated into the carrier such that a first portion of the fiber protrudes to the front side of the carrier and that a second portion of the fiber is located at the back side of the carrier, at least the second portion of the fiber being incorporated into the polyurethane backing.

It is understood that one or more of the aforementioned embodiments of the invention may be combined as long as the combined embodiments are not mutually exclusive.

BRIEF DESCRIPTION OF THE DRAWINGS

In the following embodiments of the invention are explained in greater detail, by way of example only, making reference to the drawings in which.

DETAILED DESCRIPTION

Like numbered elements in these figures are either equivalent elements or perform the same function. Elements which have been discussed previously will not necessarily be discussed in later figures if the function is equivalent.

Figure 1:
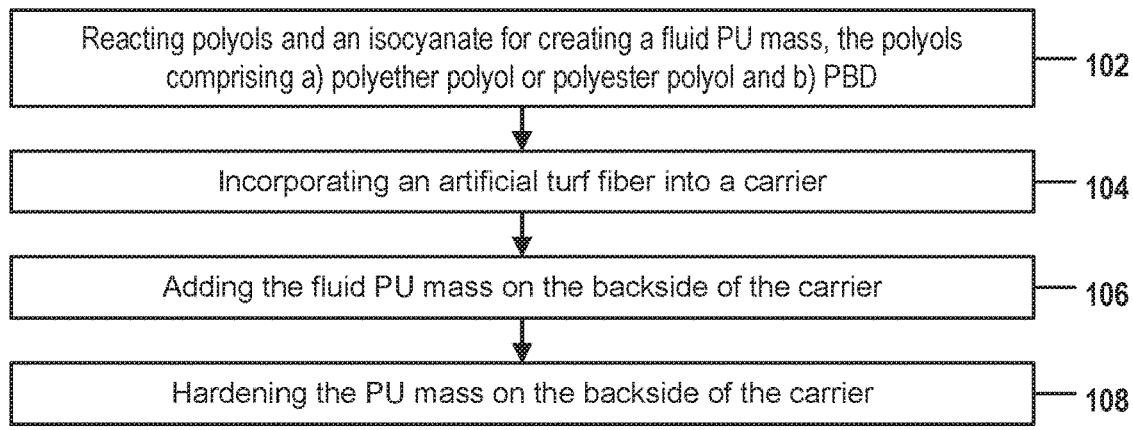
FIG. 1 shows a flow chart of a method of manufacturing a PU-based artificial turf.

FIG. 1 shows a flow chart of a method of manufacturing a PU-based artificial turf backing 602 as shown, for example, in FIG. 6. In a first step 102, a fluid polyurethane mass 210 is created as depicted, for example, in FIG. 2. The creation of the liquid PU mass comprises reacting first and second polyols with an isocyanate. The first polyol is a polyether polyol or a polyester polyol or a mixture thereof, and the second polyol is polybutadien diol. The polyether and/or polyester polyol have two hydroxyl groups per molecule.

Polyether polyols are made by reacting epoxides like ethylene oxide or propylene oxide with the multifunctional initiator in the presence of a catalyst, often a strong base such as potassium hydroxide or a double metal cyanide catalyst such as zinc hexacyanocobaltate-t-butanol complex. Common polyether polyols are polyethylene glycol, polypropylene glycol, and poly(tetramethylene ether) glycol.

Polyesters are formed by condensation or step-growth polymerization of polyols and dicarboxylic acids (or their derivatives), for example diethylene glycol reacting with phthalic acid. Alternatively, the hydroxyl group and the carboxylic acid (or their derivatives) may be within the same molecule, as in the case of caprolactone. Polyether polyols and/or polyester polyols can be bought ready-made from various suppliers.

The isocyanate comprises isocyanate monomers, isocyanate polymers or isocyanate prepolymers or a mixture of isocyanate monomers, isocyanate polymers and isocyanate prepolymers. The isocyanate monomers, polymers and prepolymers have two or more isocyanate groups per molecule.

For example, the isocyanate can be methylene diphenyl diisocyanate ("MDI"). MDI is an aromatic diisocyanate. It exists in three isomers, 2,2'-MDI, 2,4'-MDI, and 4,4'-MDI. Embodiments of the invention may be based on any of said isomers, preferentially the 4,4' isomer is used as the isocyanate. MDI reacts with the polyols (i.e., with the PBD and the polyether polyol or the polyester polyol) in the manufacture of the PU mass.

In step 104, one or more turf fibers are incorporated into a carrier, e.g. a textile or other material comprising perforations. For example, the incorporation may comprise weaving, spinning, twisting, rewinding, and/or bundling the a monofilament, e.g. a stretched monofilament, into the artificial turf fiber and then incorporating the fiber into the carrier. This technique of manufacturing artificial turf is known e.g. from United States patent application US 20120125474 A1.

Figure 3:
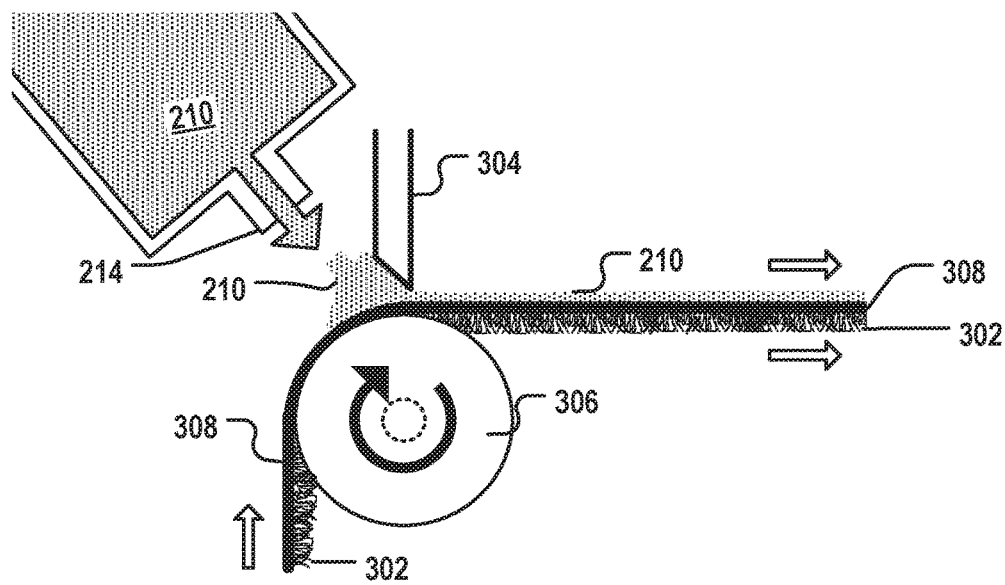
FIG. 3 shows a "knife over roll" PU-coating process.

In step 106, the liquid PU mass generated in step 102 is added on the backside of the backside of the carrier (see e.g. FIG. 3). Thereby, the fibers, including the monofilaments within bundled fibers, and the carrier material are wetted by the liquid PU mass.

In step 108, the liquid PU mass solidifies into a solid PU-based artificial turf backing that strongly fixes hydrophobic fibers without the need to create chemical bonds between the PU backing and the fiber material. For example, the PU mass on the backside of the carrier may be hardened at room temperature or in an oven.

Figure 2:
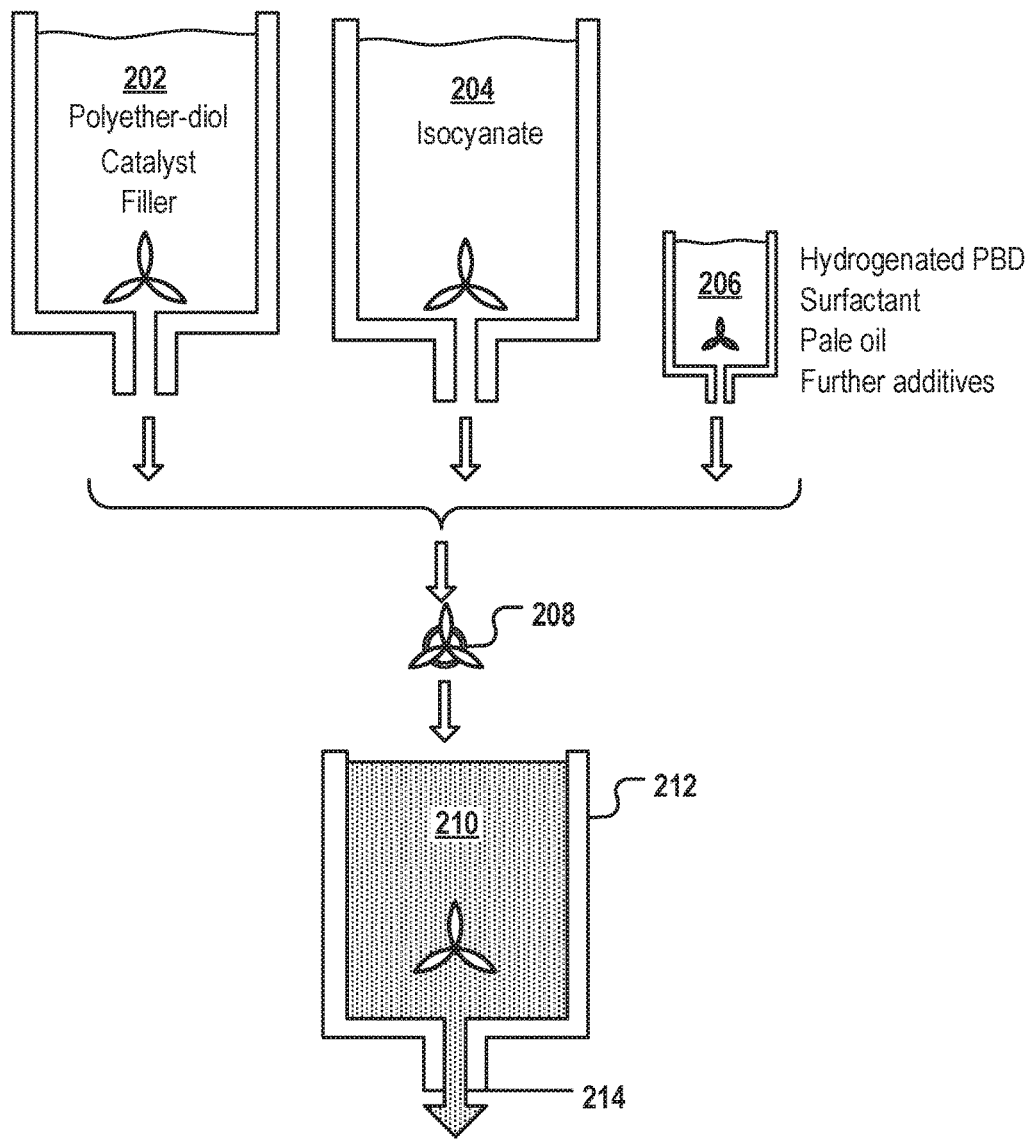
FIG. 2 shows multiple tanks and mixers comprising educts and the reaction mixture for creating PU.

FIG. 2 shows multiple tanks and mixers comprising educts and the reaction mixture for creating PU.

A first mixing unit is used for creating a first mixture comprising the polyether polyol or the polyester polyol (but not the hydrogenated PBD). For example, the first mixture comprises a polyether-polyol, e.g. a polyether-polyol having a number average molecular weight of about 4000 g/mol, e.g. a polyol based on polymerized propyleneoxide. The polyether polyol may be obtained e.g. in the form of a ready-made polyol.

Optionally, the first mixture comprises filler materials. Adding a filler may reduce cost and/or help to achieve a particular look or weight. Fillers can be, for example selected from the group ground limestone, precipitated calcium carbonate, china clay, cold fly ash, silicates and other inert material including non-reactive liquids. Moreover fillers with flame retardant and/or intumescent efficiency like aluminium trihydroxide or ammonium polyphosphate can be used or mixtures of the aforementioned fillers.

Moreover, the first mixture may comprise a catalyst for boosting the polyaddition reaction that generates the PU. The catalyst can be, for example, amine compounds and metal-organo complexes. Traditional amine catalysts have been tertiary amines such as triethylenediamine (TEDA, 1,4-diazabicyclo[2.2.2]octane or DABCO), dimethylcyclohexylamine (DMCHA), and dimethylethanolamine (DMEA).

Metal-organo complexes used as polyurethane catalysts can be based e.g. on mercury (e.g. mercury carboxylates), lead, tin (e.g. alkyl tin carboxylates and oxides), bismuth, and zinc (e.g. bismuth and zinc carboxylates).

The first mixture is then stored in a first tank 202, e.g. a day tank, i.e., a tank sized to provide a day's worth of usage.

The second mixture, i.e., the isocyanate monomer/polymer/prepolymers mixture, e.g. MDI, is stored in a second tank 204 that is preferentially also a day tank.

A further container 206 that is typically of a smaller size than the first and second tank comprises a third substance mixture. The third substance mixture comprises the PBD and optionally further substances such as a wetting agent, pale oil and/or one or more further additives. The one or more further additives can be, for example, flame retardants, pigments, extenders, cross linkers, blowing agents etc. The container 206 may be part of or coupled to a blender 208. The blender 208 receives the first mixture from the first container, receives the second mixture from the second container 204 and receives the PBD and the one or more optional substances (wetting agent, pale oil and/or further additives) from the further container 206. The blender 208 blends the first, second and third mixtures received from respective tanks and containers in amounts suited to generate a reaction mixture 210 whose substance concentrations are within the ranges specified herein for embodiments of the invention. For example, the first, second and third mixtures are blended such that the number of OH groups in the first polyol molecules in the first mixture in combination with the number of OH groups in the PBD molecules in the third mixture will roughly correspond (e.g. in a range of ratios ranging from "0.9:1" to "1:0.9") to the number of NCO groups in the isocyanate molecules (monomers and prepolymers). The third mixture is added by the blender 208 to the reaction mixture 210 in such an amount that the PBD in the reaction mixture has a concentration range of 0.5-5% by weight of a combination of the first polyol and the isocyanate.

An example of a third mixture is given below:

| Description | % by weight of the third mixture in container 206 |
|---|---|
| Hydrogenated hydroxyl-terminated polybutadiene (PBD): | 56% |
| Conductivity additive & pigments | 16% |
| Pale oil | 28% |

The third mixture will be blended with the first and second mixture such that the PBD is contained in the reaction mixture/liquid PU mass in an amount of 0.5-5% of a combination of the first polyol and the isocyanate.

According to embodiments, the first and second mixtures in the first and second tanks are supplied as "two pack systems" or "two component systems" wherein the polyol part acts as the first mixture in the first tank and the polyisocyanates part acts as the second mixture in the second tank. While the first and second mixtures may be bought as ready-made two-component PU-generation systems, the third mixture in container 206 may be customized to specific needs of a customer, e.g. by adding a certain pigment to achieve a desired coloring effect or by adding a certain amount of PBD and/or oil and wetting agent in order to achieve a desired viscosity given a desired PU-density.

The blender 208 may be a low-pressure gear pump, which produce a desired mixing ration of the first, second and third mixtures. Ratio and material distribution are driven by a computer assisted equipment. Despite the viscosity of the PU mass 210, the PU mass penetrates deeply into the tufts of artificial grass, and wets the textile carrier and the monofilaments contained therein.

The reaction mixture 210 generated by the blender 208 is output to a container 212 that may have the form of a hose. The chamber 212 has an opening 214 that leads to a coater, e.g. a "knife over roll" coating assembly as depicted, for example, in FIG. 3. Typically, the reaction mixture output by the blender 208 reaches the opening 214 being part of the coating assembly within 30 seconds. At this point, the polyaddition reactions resulting in the generation of the liquid PU mass used for coating a carrier textile of a piece of artificial turf will largely have completed already, but some reactions may still continue during the coating process.

According to embodiments, the first polyol(s), the PBD and the isocyanate in total constitute at least 25%, according to other embodiments at least 40%, or even more than 95% of the total amount of the total reaction mix used for generating the liquid PU mass that—after a curing process—is used as the artificial turf backing. This means that the totality of fillers, wetting agents, pale oils and any further additives (e.g. extenders, cross linkers, surfactants, flame retardants, blowing agents, pigments, and so on) typically constitutes less than 75%, or less than 60%, or in further embodiments less than 5% by weight of the reaction mix used for generating the PU. An example would be a reaction mixture comprising about 20% isocyanate, 4% PBD, 20% first polyol, 2% catalyst, 3% additives like oils, dyes or flame retardants, and 51% filler material. In some example embodiments the reaction mixture does not comprise any filler material.

According to preferred embodiments, the liquid PU mass is a non-foam polyurethane, i.e., a PU that is (substantially) non-porous.

Polyols or polyhydroxylated compounds are known to absorb water and generally are the source for the introduction of water into the formulation. Moisture is introduced either in the polyhydroxylated compound or in some other ingredient, and this moisture can react with the isocyanate to produce urea linkages and carbon dioxide. The urea linkages are strong and desirable; however, the carbon dioxide causes bubbles to appear in the product. In many cases, the presence of bubbles in the product weakens the structure of the PU backing. Therefore, according to embodiments of the invention, the reaction conditions and educts are chosen such that a non-foamed liquid PU mass 210 is generated. The generation of "non-foamed" liquid PU masses is described, for example, in "Polyurethanes: Science, Technology, Markets, and Trends", Mark F. Sonnenschein, ISBN: 978-1-118-73791-0.

FIG. 3 shows a "knife over roll" PU-coating process and a corresponding coating assembly. The liquid, viscous reaction mix 210, which is also referred to as liquid PU mass upon leaving the opening 214 of the container 212, is applied on a carrier structure 308. A plurality of artificial turf fibers 302 protrude from the front side of the carrier structure and the liquid PU mass 210 is applied on the back side of the carrier. The PU mass is applied continuously while a roll 306 causes the carrier 308 to move in a direction indicated by the arrows. A "knife" 304 shown in cross section view is located at a defined distance above the carrier 308 and ensures that the viscous PU mass 210 passing the space between the knife 304 and the carrier 308 has a defined height.

According to preferred embodiments, the liquid PU mass is a non-foam polyurethane, i.e., a PU that is (substantially) non-porous.

The high viscosity of the PU mass according to embodiments of the invention and the configuration and dimensions of the opening 214 and the speed of the PU mass flow through this opening are chosen such that a defined amount of PU mass builds up and accumulates in front of the front side of the knife 304. This ensures that the thickness of the PU backing of the generated piece of artificial turf is constant.

After the PU mass 210 was homogeneously applied on the back side of the carrier 308, it is hardened (increase of viscosity) by keeping the coated piece of artificial turf for about 10 minutes at room temperature. Typically, the PU backing is solid 30 minutes after its application on the carrier.

Preferentially, in order to sped up the solidification, the artificial turf is exposed to elevated temperatures around 100° C. Typically, after 90 seconds at elevated temperature, 90 to 95% of the PU mass is "cured" (is in solid state). For example, the coating assembly may automatically transport the coated piece of artificial turf in an oven.

Figure 4:
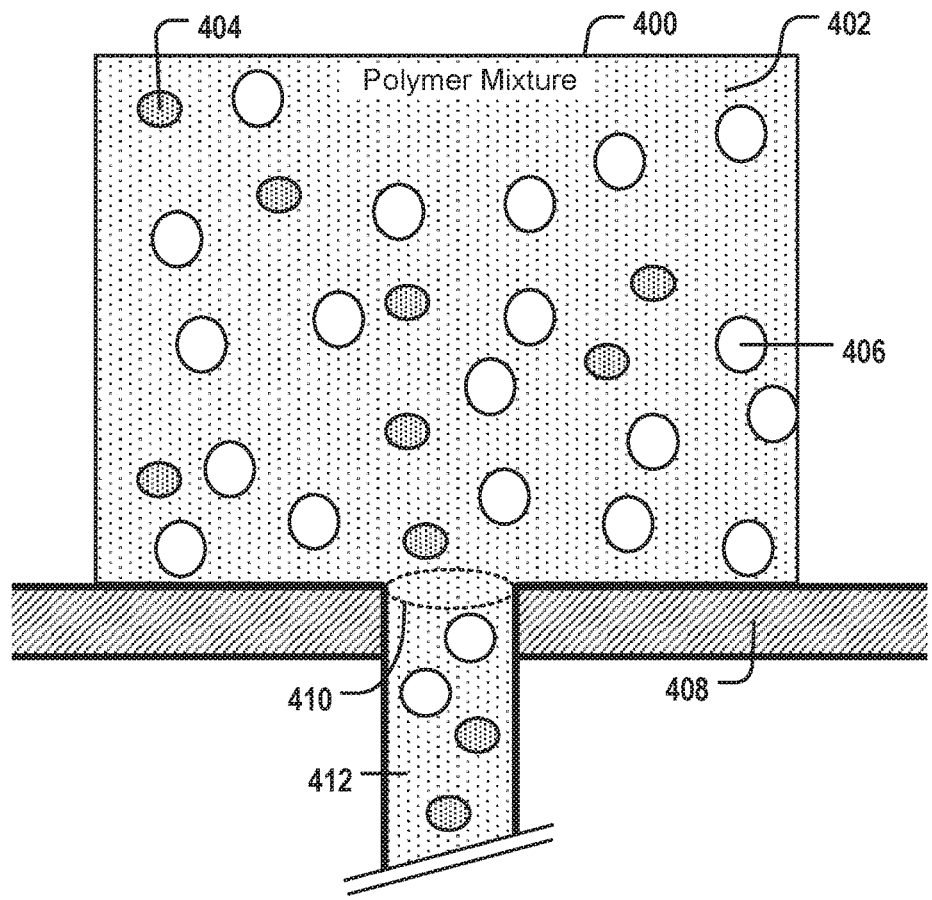
FIG. 4 illustrates the extrusion of the polymer mixture into a monofilament.

FIG. 4 illustrates a liquid polymer mixture 400. The polymer is a polyolefin, e.g. a polyethylene mixture. The polymer mixture is used for producing a monofilament 412 in an extrusion process. The polymer mixture 400 comprises additives 404, 406 such as UV-stabilizers, pigments, flame retardants or the like. A screw, piston or other device is used to force the polymer mixture 400 through a hole 410 in a plate 408. This causes the polymer mixture 400 to be extruded into a monofilament 412. In some embodiments, the polymer mixture may comprise polymer beads 408 of a more rigid polymer, e.g. polyamide. Due to flow dynamics during the extrusion process, the beads will tend to concentrate in the center of the monofilament 412. This may lead to a concentration of rigid, thread-like PA regions in the core region of the monofilament while the surface of the monofilament almost completely consists of the hydrophobic PE. Thus, a fiber with increased resilience is provided which has a soft PE surface that protects against injuries and skin burns which, however, has a very hydrophobic surface and may therefore easily detach from a polar PU backing.

Thus, the monofilament is produced by feeding the polymer mixture 400 into an fiber producing extrusion line. The melt mixture is passing the extrusion tool, i.e., a spinneret plate or a wide slot nozzle, forming the melt flow into a filament or tape form, is quenched or cooled in a water spin bath, dried and stretched by passing rotating heated godets with different rotational speed and/or a heating oven. The monofilament or fiber may later be annealed online in a second step passing a further heating oven and/or set of heated godets.

According to embodiments, manufacturing an artificial turf fiber (which may comprise one or more monofilaments 412) comprises forming the stretched monofilament into a yarn. Multiple, for example 4 to 8 monofilaments, could be formed or finished into a yarn.

According to embodiments, the extrusion is performed at a pressure of 40-140 bars, more preferentially between 60-100 bars. The polymer mixture may be created by adding polymer granules to a solid polymer composition that is mixed and heated until all polymers are molten. For example, the polymer mixture may be heated to reach at the time of extrusion a temperature of 190-260° C., more preferentially 210-250° C.

According to embodiments, the stretching comprises stretching the reheated monofilament according to a stretch factor in the range of 1.1-8, more preferentially in the range of 3-7.

According to embodiments, the quenching is performed in a quenching solution having a temperature of 10-60° C., more preferentially between 25° C.-45° C.

According to embodiments, the incorporation of the artificial turf fiber into the carrier comprises tufting or weaving the artificial turf fiber into the carrier.

According to embodiments, the quenching solution, e.g. a water bath, has a temperature (right after the extrusion nozzle or hole(s)) of 10-60° C., more preferentially between 25° C.-45° C., and even more preferentially between 32° C.-40° C.

According to embodiments, the extrusion is performed at a pressure of 80 bar, the polymer mixture at time of extrusion has a temperature of 230° C., the stretch factor is 5 and the quenching solution, e.g. a water bath, has a temperature of 35° C.

Figure 5A:
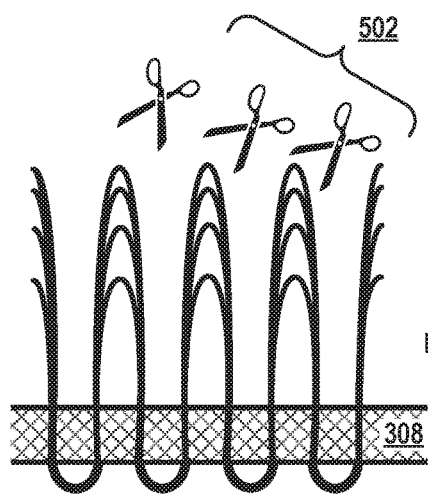
FIGS. 5a-5b shows the tufting of an artificial turf fiber and illustrates first and second parts of the fiber.

FIG. 5a shows the tufting of an artificial turf fiber and how a plurality of artificial turf fibers can be arranged in a carrier 308, e.g. a textile plane, by means of tufting. The carrier 308 may be a textile made of a hydrophobic polymer, e.g. PE. Tufting is a type of textile weaving in which an artificial tuft fiber 501 (that may be a monofilament 412 or a bundle of multiple monofilaments) is inserted on a carrier 308.

A "monofilament" as used herein is a filament generated by extruding a liquid polymer mixture through a single opening or is a slice of a polymer tape generated in accordance with the slit film technique.

Figure 5B:
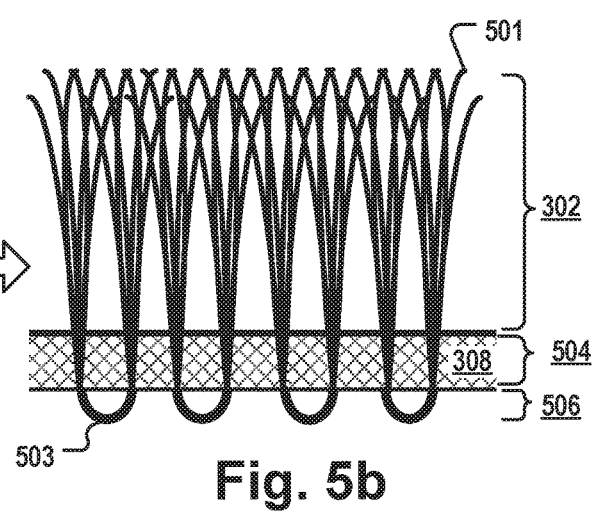

After the inserting is done, as depicted in FIG. 5a, short U-shaped loops of the fiber point outside of the carrier's surface. Then, one or more blades cut 502 through the loops. As a result of the cutting step, two artificial turf fiber ends per loop and monofilament point out from the carrier and a grass-like artificial turf surface is generated as depicted in FIG. 5b. Thereby, first portions 506 of the monofilaments (corresponding to first portions of the artificial turf fibers) which have been inserted in the carrier 308 are exposed to a bottom side (back side) of the carrier and second portions 302 of said monofilaments are exposed to a top side of the carrier. Some portions 504 of the monofilaments/fibers are located within the carrier structure. Fibers or fiber bundles may protrude in loops 503 outside of the back side of the carrier. The piece of artificial turf generated in the tufting process may be forwarded to the coating assembly depicted in FIG. 3 for applying the PU mass 210 on the back side of the carrier.

Figure 6A:
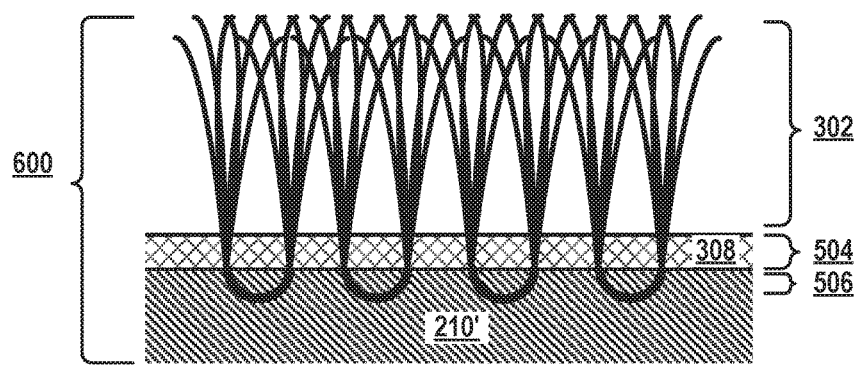
FIGS. 6a-6b shows portions of monofilaments and fibers embedded in the PU backing.
Figure 6B:
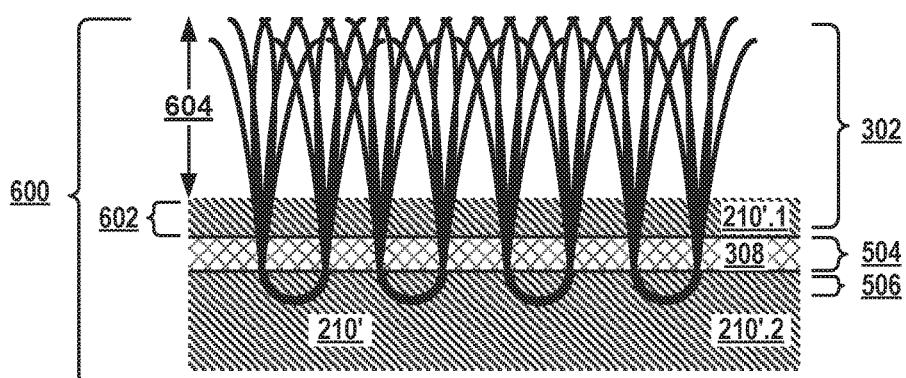

FIGS. 6a and 6b show portions of monofilaments and fibers which are embedded in the PU backing. Reference number 600 refers to the total height of a piece of artificial turf having been coated with the PU mass 210 generated according to embodiments of the invention. The hydrophobized PU mass may optionally contain pale oil and a surfactant in liquid or fluid state has flown around and wetted the fibers, including the monofilaments located in the inside of a fiber consisting of a plurality of monofilaments. The PU mass 210' depicted in FIGS. 6a and 6b has already solidified and strongly fixes the hydrophobic polymer monofilaments in the PU backing.

FIGS. 6a and 6b correspond to different embodiments of the invention.

FIG. 6a shows a piece of artificial turf made from a highly viscous PU mass and/or with a close meshed carrier 308 that prevents the PU mass from penetrating and transgressing the carrier. In this embodiment, first portions 302 of the filaments 501 protrude from the carrier 308 to the front side of the artificial turf and are not embedded in a PU film as the liquid PU mass 210 was not able to reach the front side of the carrier during the coating process. Also the fiber portions 504 within the carrier are not wetted by the PU mass in this embodiment. However, second parts 506 of the monofilaments were embedded in the liquid PU mass 210 during the coating process. Although the length of said second portions is comparatively small, the high hydrophobicity and the improved wetting of the fibers by the PU mass 210 ensure that the fibers are firmly fixed by Van-der-Waals forces in the backing and that a slip stick effect further protects the fibers against tuft withdrawal forces.

FIG. 6b shows a piece of artificial turf made from a less viscous PU mass (compared to the embodiment of FIG. 6a) and/or with a wide-meshed carrier 308. The carrier may be a textile mesh or another type of material that comprises perforations that allow the PU mass 210 to penetrate the carrier and reach the front side of the artificial turf. Thus, portion 302 of the fibers in FIG. 6b comprises a first portion 604 which is not embedded in the PU film 210 and another portion 602 which is embedded in the PU film 210.2 having penetrated the carrier. In addition, portions 504 and 506 are wetted by and are embedded in the liquid PU mass 210. Thus, the carrier, portions of the fibers inserted in the carrier and further portions 602 of the fibers at the front side of the carrier may become embedded in the PU backing in addition to the portions 506 on the backside of the carrier.

The liquid PU mass 210 added in the coating process on the backside of the carrier surrounds and thereby mechanically fixes at least some portions of the monofilaments of the arranged artificial turf fibers. Then, the liquid PU mixture 210 solidifies into a PU-based artificial turf backing 210' at room temperature or in an oven. The solid film acts as the artificial turf backing. In some examples, additional coating layers may be added on the bottom of the artificial turf backing.

LIST OF REFERENCE NUMERALS

| | |
|---|---|
| 102-104 | steps |
| 202 | first tank for first mixture |
| 204 | second tank for second mixture |
| 206 | container for third mixture |
| 208 | blender |
| 210 | PU mass |
| 210' | solidified PU mass |
| 212 | hose of coating assembly |
| 214 | opening of hose |
| 302 | fibers protruding from carrier |
| 304 | knife |
| 306 | roll |
| 308 | carrier, e.g. textile mesh |
| 400 | polymer mixture for fiber creation |
| 402 | hydrophobic fiber polymer |
| 404 | additive |
| 406 | additive |
| 408 | plate |
| 410 | opening of extrusion nozzle |
| 412 | extruded monofilament |
| 501 | artificial turf fiber |
| 502 | cutting operation |
| 503 | fiber loop |
| 504 | fiber portion within carrier |
| 506 | fiber portion protruding to the back side of the carrier |

| | |
|---|---|
| 600 | artificial turf |
| 602 | fiber portion protruding to the front side of the carrier being embedded in the PU mass |
| 604 | fiber portion protruding to the front side of the carrier not being embedded in the PU mass |

The invention claimed is:

1. A method of manufacturing an artificial turf, the method comprising:
creating a nonaqueous non-foamed fluid polyurethane mass, the creating comprising reacting first and second polyols with an isocyanate,
the first polyol being a polyether polyol and/or a polyester polyol having at least 2 hydroxyl groups per molecule, the second polyol being polybutadien diol having an amount of 2.0-4.0% by weight of a combination of the first polyol and the isocyanate,
the isocyanate comprising isocyanate monomers, isocyanate polymers or isocyanate prepolymers or a mixture thereof, the isocyanate monomers, isocyanate polymers and the isocyanate prepolymers having two or more isocyanate groups per molecule;
adding a wetting agent to a mixture comprising the first and/or second polyols and/or comprising the isocyanate, the wetting agent being a surfactant having an amount of 0.05-0.15% by weight of a combination of the first and second polyols and the isocyanate;
incorporating an artificial turf fiber into a carrier such that a first portion of the artificial turf fiber protrudes to a front side of the carrier and that a second portion of the artificial turf fiber is located at a back side of the carrier, wherein the carrier includes perforations;
adding the nonaqueous non-foamed fluid polyurethane mass on the back side of the carrier, the nonaqueous non-foamed fluid polyurethane mass thereby incorporating the second portion of the artificial turf fiber and penetrating the carrier via the perforations to reach the front side of the carrier to incorporate least a portion of the first portion of the artificial turf fiber; and
hardening the nonaqueous non-foamed fluid polyurethane mass on the back side of the carrier.

2. The method of claim 1, the polybutadien diol having a number average molecular weight in a range of 1000 to 6000 g/mol.

3. The method according to claim 2, wherein the polybutadien diol has a number average molecular weight in a range of 1500 to 4500 g/mol.

4. The method of claim 1, the polybutadien diol being a hydrated polybutadien diol.

5. The method of claim 1, the first polyol being free of polybutadien diol.

6. The method according to claim 5, wherein the first polyol comprises a polycarbonate polyol, a polycaprolactone polyol, a propylene oxide based polyol, a polypropylene polyol, a polysulfide polyol, a polyether glycol, or a mixture thereof.

7. The method of claim 5, the first polyol further comprising a polyester-polyol.

8. The method of claim 1, further comprising adding an oil to the mixture comprising the first and second polyols and/or comprising the isocyanate, the oil being added in an amount of 0.5% to 4% by weight of a combination of the first and second polyols and the isocyanate.

9. The method of claim 8, the oil being a pale oil.

10. The method according to claim 8, the oil being added in an amount of 0.7% to 1.2% by weight of a combination of the first and second polyols and the isocyanate.

11. The method of claim 1, the nonaqueous non-foamed fluid polyurethane mass having a density of more than 1000 g/l.

12. The method according to claim 11, wherein the nonaqueous non-foamed fluid polyurethane mass has a density in a range of 1100 g/l-1500 g/l.

13. The method according to claim 12, wherein the nonaqueous non-foamed fluid polyurethane mass has a density in a range of 1200 g/l-1400 g/l.

14. The method of claim 1, wherein incorporating the artificial turf fiber into the carrier comprises:
tufting the artificial turf fiber into the carrier; or weaving the artificial turf fiber into the carrier.

15. The method of claim 1, wherein the artificial turf fiber is a hydrophobic polyolefin fiber.

16. The method of claim 1, the hardening of the nonaqueous non-foamed fluid polyurethane mass comprising:
heating the nonaqueous non-foamed fluid polyurethane mass on the back side of the carrier to a temperature of 70-140° C.

17. The method of claim 1, further comprising generating the artificial turf fiber, the generation comprising:
generating a polymer mixture;
extruding the polymer mixture into a monofilament;
quenching the monofilament;
reheating the monofilament; and
stretching the reheated monofilament to form the monofilament into the artificial turf fiber.

18. The method of claim 17, the polymer mixture comprising a nucleating agent for crystallizing a polymer within and at a surface of the monofilament.

19. The method of claim 1, wherein the artificial turf fiber is a bundle of monofilaments.

20. The method according to claim 1, wherein the first polyol, the second polyol and the isocyanate are blended such that a number of OH groups in first polyol molecules in the first polyol in combination with a number of OH groups in polybutadien diol molecules in the second polyol will substantially correspond to a number of NCO groups in isocyanate molecules of the isocyanate.

21. The method according to claim 1, wherein the nonaqueous non-foamed fluid polyurethane mass comprises about 20% by weight of the isocyanate, 4% by weight of the polybutadien diol, 20% by weight of the first polyol, 2% by weight of a catalyst, 3% by weight of additives, and 51% by weight of a filler material.

22. The method according to claim 21, wherein the catalyst comprises a potassium hydroxide, a double metal cyanide, amine compounds or metal-organo complexes, wherein the additives comprise one or more of flame retardants, pigments, extenders, cross linkers, blowing agents and oils, and wherein the filler material is selected from the group consisting of ground limestone, precipitated calcium carbonate, china clay, cold fly ash and silicates.

23. An artificial turf manufactured according to the method of claim 1.

* * * * *